United States Patent [19]

Hattori et al.

[11] Patent Number: 4,873,576
[45] Date of Patent: Oct. 10, 1989

[54] CAMERA EQUIPPED WITH A TELEVISION SET

[75] Inventors: Tsuyoshi Hattori; Masanao Tanaka, both of Hino; Syoji Matsuzaka, Hachioji, all of Japan

[73] Assignee: Konica Corporation, Tokyo, Japan

[21] Appl. No.: 227,390

[22] Filed: Aug. 2, 1988

[30] Foreign Application Priority Data

Aug. 3, 1987 [JP] Japan .................. 62-192721

[51] Int. Cl.⁴ .................. H04N 5/30; H04N 5/64
[52] U.S. Cl. .................. 358/224; 358/254
[58] Field of Search .............. 358/254, 906, 335, 224; 369/12, 11, 33.1, 35.1; 379/53

[56] References Cited

U.S. PATENT DOCUMENTS

| | | | |
|---|---|---|---|
| 3,833,758 | 9/1974 | Ferrari | 358/53 |
| 4,396,941 | 8/1983 | Nishimura et al. | 358/254 |
| 4,437,126 | 3/1984 | Gottschalk | 358/224 |
| 4,652,932 | 3/1987 | Miyajima et al. | 358/254 |
| 4,692,006 | 9/1987 | Rice et al. | 358/224 |
| 4,715,059 | 11/1985 | Cooper-Hart et al. | 379/53 |
| 4,716,426 | 12/1987 | Endo | 354/76 |

FOREIGN PATENT DOCUMENTS

| | | |
|---|---|---|
| 2119090 | 1/1974 | Fed. Rep. of Germany . |
| 649393 | 5/1985 | Switzerland . |
| 2054317 | 2/1981 | United Kingdom . |
| 2105859 | 3/1983 | United Kingdom . |

Primary Examiner—Jin F. Ng
Assistant Examiner—Stephen Brinich
Attorney, Agent, or Firm—Finnegan, Henderson, Farabow, Garrett, & Dunner

[57] ABSTRACT

A camera equipped with a television set wherein a display screen of the television set is utilized to display a camera image to be photographed. A camera equipped with a television set which is described above, wherein the display screen is of a liquid crystal color display type. The camera equipped with a television set which is described above, wherein an image to be photographed, as well as photographing data are displayed on the display screen. The camera equipped with a television set as described above, wherein the display screen is capable of displaying an image to be photographed for a prescribed period of time.

5 Claims, 2 Drawing Sheets

CAMERA EQUIPPED WITH A TELEVISION SET

FIELD OF THE INVENTION

The present invention relates to a camera equipped with a television set.

BACKGROUND OF THE INVENTION

A camera combined with a radio set, is publicly known and is really nothing more than separate pieces of equipment using a frame in common. In contrast, in the when a television set and a camera are combined, the camera may share the display with the television set, to display an image of the subject to be photographed. As a result, the inconvenience whereby a photographer must look into the viewfinder of a conventional camera can be avoided. This explains the motivation behind the present invention of a camera equipped with a television set.

SUMMARY OF THE INVENTION

An object of the present invention is to overcome the problems and disadvantages of the prior art.

Another object of the present invention is that the photographer can enjoy watching television on the display installed in the camera when not utilizing the camera. Another object of the present invention is that while taking a photograph, the photographer can take it by watching the subject on the display without looking into the viewfinder.

Another object of the present invention is the use of a display both as a finder and a television display such that a subject can be seen from the outside of the camera.

Additional objects and advantages of the present invention are set forth in part in the following description, or may be learned by practice of the invention. The objects and advantages of the present invention will be realized and attained by means of the elements and combinations particularly pointed out in the appended claims.

BRIEF DESCRIPTION OF THE DRAWING

The accompanying drawings, which are incorporated in and constitute a part of this specification, illustrate several embodiments of the present invention and together with the description, serve to explain the principles of the present invention.

DETAILED DESCRIPTION OF THE PREFERRED EMBODIMENTS

Figure 1:
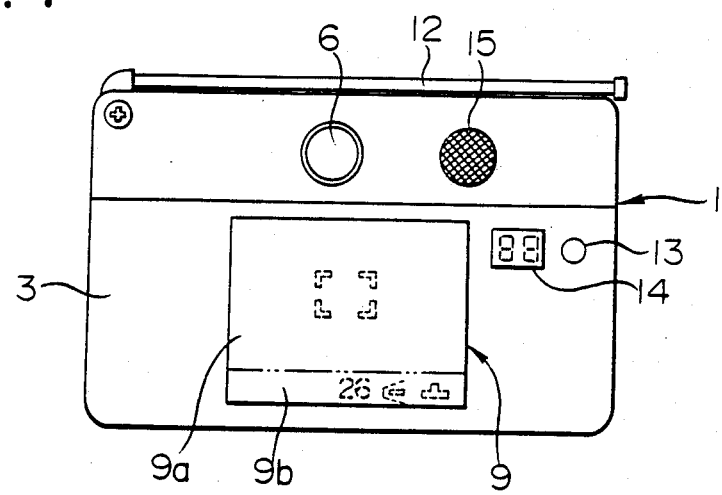
FIG. 1 is a rear view of the camera equipped with a television set of the present invention.

The present invention is explained with the drawings as follows.

Illustrated in FIG. 1, FIG. 2, FIG. 3 and FIG. 4 is one embodiment of the camera equipped with a television set of the present invention, and comprises the camera body (1), the lens barrel (2), the back lid (3), the release button (4), the viewfinder objective lens (5), the viewfinder eye piece (6), the half mirror (7), the CCD area image sensor (8), the color or monochrome liquid crystal display (9), the power switch (10), the camera/television selector switch (11), the television antenna (12), the television channel changeover button (13), the television channel number display (14) and the speaker (15).

Figure 2:
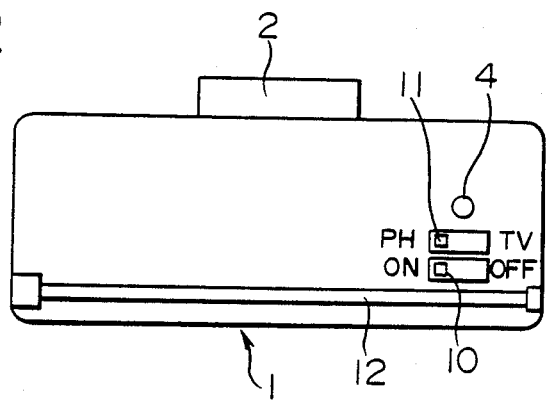
FIG. 2 is a top view of the camera of the present invention.
Figure 3:
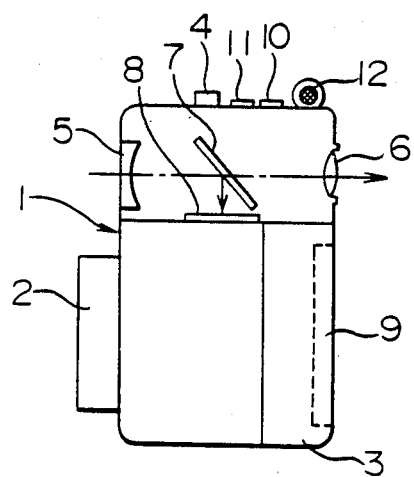
FIG. 3 is a side view that showing a part of the optical path of the viewfinder of the present invention.

FIG. 2 shows that the camera/television selector switch (11) is switched to the PH side to take a photograph. If the power switch (10) is turned on in this condition as shown in FIG. 2, the subject image given by the incident light which has passed through the viewfinder objective lens (5), been reflected by the half mirror (7) and been projected on the CCD area image sensor (8), is then, together with the date, displayed on the subject image display section (9a) of the liquid crystal display (9). Furthermore, photograph taking conditions such as the film frame number, luminance information of the subject image, information about the battery and so forth, are displayed on the photograph taking condition display section (9b). Therefore, a photograph can be taken by pushing the release button (4) watching the liquid crystal display (9) without looking into the viewfinder. In other words, the viewfinder eye piece (6) can be omitted. In this case, all of the light which has passed through the finder objective lens (5) can be projected to the CCD area image sensor (8).

The reason why the date is displayed on the subject image display section (9a) of the liquid crystal display (9), is that the date is photographed on the film by light emitting elements. The clock that gives the date to the camera is always operational, having no connection with the power switch.

When the release button (4) is pushed, the subject image to be photographed is held on the display for a prescribed few seconds, according to the information from the shutter. After that, the subject image through the viewfinder objective lens (5) is displayed, which is the same as the image seen through the viewfinder eye piece (6). The purpose of holding the subject image for a prescribed few seconds is for confirmation that the image is just what the photographer wanted.

The display image on the liquid crystal display is controlled by a microcomputer. Adjustment of the contrast of the subject image and shutter speed, in accordance with information about the film sensitivity and photometry, can be achieved by the publicly known image information processing technique. Changing resolution according to information about the lens position and measured distance can also be achieved by this technique. By this method, the photographer can make sure that the photo is going to be taken, or has been taken under proper conditions in terms of exposure and focus. FIG. 1 shows an example wherein the focusing frame is shown in the subject image display section (9a). In this case, the photographer knows that the focus is correct by the image in this focusing frame.

When the camera/television selector switch (11) is turned to the television side and the power switch (10) is turned on, the whole liquid crystal display (9) is ready to show a television image. Then, if the television channel selector button (13) is turned to the required channel according to the indication on the number display (14), the antenna is set adequately and the camera body is set in the proper direction, one can enjoy watching television. If the camera/television selector switch (11) is turned to the television side, the release button (4) is locked so as not to be depressed.

Figure 4:
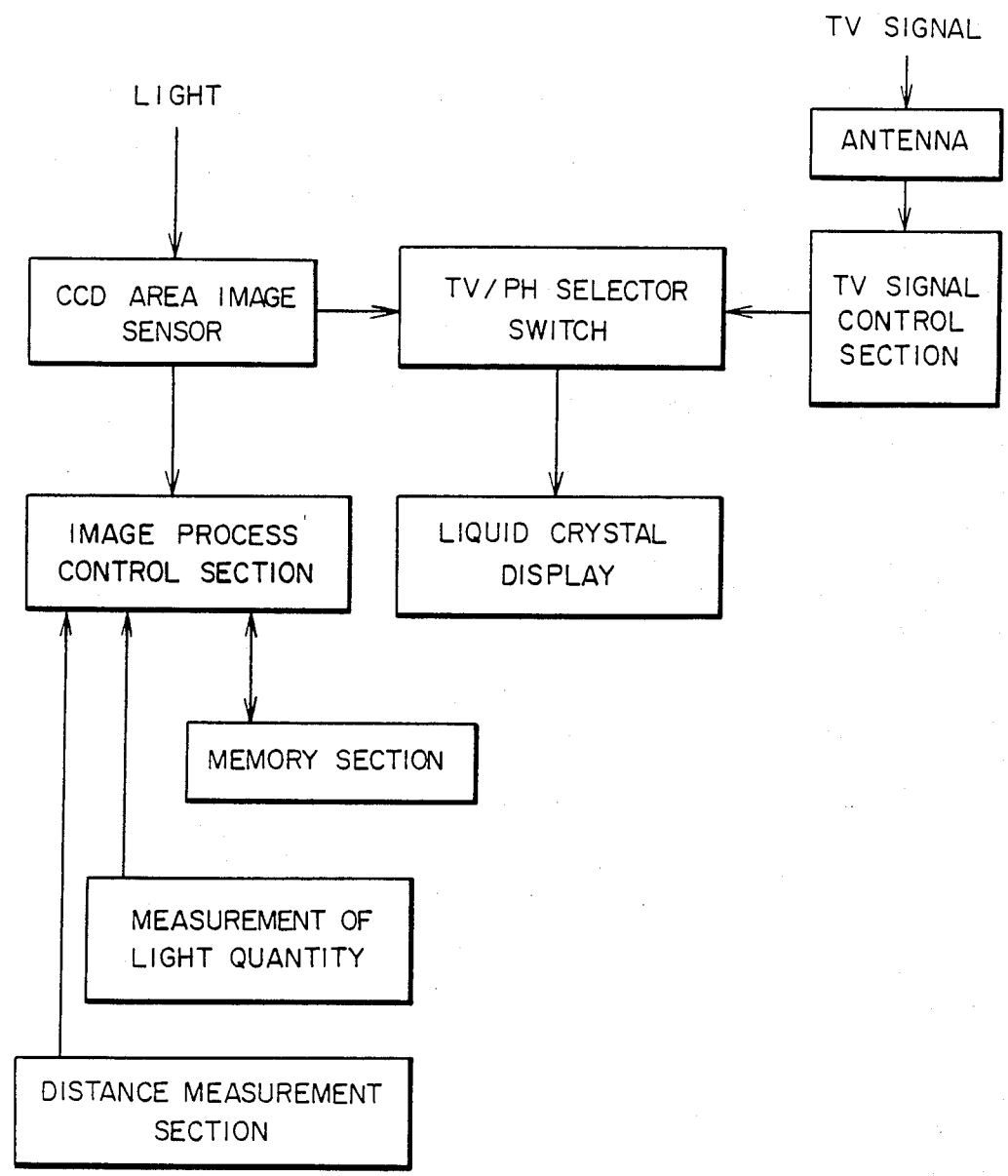
FIG. 4 is a block diagram showing the control circuit of the camera of the present invention.

The control circuit of a camera of this invention is shown in the block diagram of FIG. 4.

The camera equipped with a television set of this invention has the great advantage that one can enjoy watching TV as well as taking photographs, whilst also making sure of the subject image to be photographed without using the viewfinder.

Other embodiments of the present invention will be apparent to those skilled in the art from consideration of the specification and practice of the disclosed invention. It is intended that the specification and examples be considered as exemplary only, with the true scope and spirit of the invention being represented by the following claims.

What is claimed is:

1. A camera for taking photographs comprising:
    a unitary casing for housing the camera and a television;
    the camera including a mirror positioned interiorly of said unitary casing for receiving the subject image being viewed and projecting said subject image on a CCD area image sensor provided interiorly of said unitary casing;
    a liquid crystal display means housed in said unitary casing and visible from the exterior of said unitary casing operable in first and second operational modes for selectively receiving and displaying said subject image from said CCD area image sensor and for displaying a television signal generated from said television, respectively; and
    selection means attached to said unitary housing for manual selection of one of said first and second operational modes.

2. The camera according to claim 1, further comprising means for delaying photographic operation of the camera for a prescribed time period to allow for user confirmation of the subject image to be photographed while continuing to display said subject image on said liquid crystal display means.

3. The camera according to claim 1, further comprising a means for measuring the quality of light entering the camera, said measuring means being attached to said unitary casing.

4. The camera according to claim 1, further comprising a viewfinder objective lens attached to said unitary casing and positioned in front of said mirror for initially receiving the incident light forming said subject image and a viewfinder eye piece affixed to said unitary casing operable in conjunction with said viewfinder objective lens to allow for user visualization of said subject image.

5. The camera according to claim 1, further comprising an antenna attached to said unitary casing for receiving television signals.

* * * * *